(12) United States Patent
Burgess et al.

(10) Patent No.: US 7,366,583 B2
(45) Date of Patent: Apr. 29, 2008

(54) METHODS AND SYSTEMS FOR FABRICATING COMPONENTS

(75) Inventors: Steven Michael Burgess, Lynnfield, MA (US); Larisa Alexandra Elman, Swampscott, MA (US); John Scott Graham, Bedford, NH (US); Michael Thomas Keating, Kingston, NH (US); Stephen Michael Carter, Bedford, NH (US); Michael Joseph Martini, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 11/217,565

(22) Filed: Sep. 1, 2005

(65) Prior Publication Data

US 2007/0050064 A1 Mar. 1, 2007

(51) Int. Cl.
G06F 19/00 (2006.01)
G05B 19/18 (2006.01)

(52) U.S. Cl. .............. 700/160; 700/186; 700/189; 318/568.1; 415/118

(58) Field of Classification Search .......... 700/95, 700/160, 181, 186, 192, 189; 703/1, 2, 7; 345/420; 318/568.1; 415/118
See application file for complete search history.

(56) References Cited

U.S. PATENT DOCUMENTS

| | | | | |
|---|---|---|---|---|
| 4,370,721 A | * | 1/1983 | Berenberg et al. | 700/195 |
| 4,382,215 A | * | 5/1983 | Barlow et al. | 318/568.1 |
| 4,833,617 A | * | 5/1989 | Wang | 700/173 |
| 5,055,752 A | * | 10/1991 | Leistensnider et al. | 318/570 |
| 5,101,363 A | * | 3/1992 | Rutkowski | 703/7 |
| 5,189,626 A | * | 2/1993 | Colburn | 700/182 |
| 5,288,209 A | | 2/1994 | Therrien et al. | |
| 5,691,909 A | * | 11/1997 | Frey et al. | 700/159 |
| 5,971,710 A | | 10/1999 | Stauffer et al. | |
| 6,082,291 A | | 7/2000 | Ittleson et al. | |
| 2002/0082742 A1 | * | 6/2002 | Kadono | 700/160 |

OTHER PUBLICATIONS

Ouellette et al., Fillet Machining Without Adaptive Probing and Parts Finished Thereby, U.S. Appl. No. 10/852,828, filed May 25, 2004, 11 pages.

* cited by examiner

Primary Examiner—Kamini Shah
Assistant Examiner—Sheela Rao
(74) Attorney, Agent, or Firm—Willaim Scott Andes, Esq.; Armstrong Teasdale LLP

(57) ABSTRACT

A method for fabricating a component using a tool includes determining an actual property of a region of the component, comparing the actual property of the region of the component with an expected property of the region to determine a difference between the actual property and the expected property, and updating a path of the tool that is electronically stored in a memory and executable by a processor for fabricating the component based on the difference between the actual property and the expected property of the region.

19 Claims, 5 Drawing Sheets

METHODS AND SYSTEMS FOR FABRICATING COMPONENTS

BACKGROUND OF THE INVENTION

This invention relates generally to fabricating components, and more specifically to fabricating components using machining processes.

Manufacturing processes fabricating at least some components, for example gas turbine engine components, may produce excess material at certain regions of the component, such as, those regions of the component that are adjacent machined surfaces. For example, known casting, milling, electro-chemical machining, and/or forging processes used in the fabrication of airfoil assemblies may produce extra material at a leading edge of the airfoil, as well as at an intersection defined between the airfoil and the hub or platform. Generally, such excess material may be removed to return the component to predesired dimensions and to ensure aerodynamic performance characteristics are satisfied. However, because of the varying shapes of components, such blending operations are generally difficult, or cost prohibitive to automate.

Accordingly, in at least some known fabrication operations, excess material is manually removed to facilitate shaping the region to desired dimensions. In this process, sometimes referred to as "benching" or "bench blending," an operator grinds away material using a rotating abrasive wheel and/or an abrasive belt. However, because of the proximity of the operator's hands to the grinding wheel, the complex shape of the components, and/or a high volume of components handled during the operator's shift, benching may require an operator have specific skills and/or experience. As such, the qualifications, or lack thereof, of the benching operators may slow down fabrication of the components. Moreover, benching may produce a variation in the blended surfaces of different components. Because of the possibility of operator errors and variations in the blended surfaces, additional inspection and/or machining processes are generally warranted, therefore possibly increasing overall fabrication costs. Moreover, benching may be a difficult and/or strenuous activity for the operator, possibly leading to repetitive motion injuries which may further increase overall fabrication costs.

BRIEF DESCRIPTION OF THE INVENTION

In one aspect, a method is provided for fabricating a component using a tool. The method includes determining an actual property of a region of the component, comparing the actual property of the region of the component with an expected property of the region to determine a difference between the actual property and the expected property, and updating a path of the tool that is electronically stored in a memory and executable by a processor for fabricating the component based on the difference between the actual property and the expected property of the region.

In another aspect, a system is provided for fabricating a component using a fabricating tool. The system includes at least one measuring tool for measuring an actual property of a region of the component, and a processor operatively connected to the measuring tool for receiving measurements therefrom. The processor is configured to determine the actual property of the region of the component using the measuring tool, compare the actual property of the region of the component with an expected property of the region that is based on a model of an expected geometry of the component to determine a difference between the actual property and the expected property, update a geometry of a surface to be fabricated on the component based on the difference between the actual property and the expected property, and update a path of the fabricating tool that is electronically stored in a memory and is executable to fabricate the surface to be fabricated based on the updated geometry of the surface to be fabricated.

In yet another aspect, a method is provided for fabricating a component using a tool. The method includes determining an actual location of a control point located within a first region of the component, comparing the actual location of the control point with an expected location of the control point that is based on a model of an expected geometry of the component to determine a displacement of the actual location of the control point from the expected location, updating a geometry of a surface to be fabricated on the component within a second region of the component based on the difference between the actual location and the expected location of the control point, and updating a path of the tool that is electronically stored in a memory and is executable to fabricate the surface to be fabricated based on the updated geometry of the surface to be fabricated.

DETAILED DESCRIPTION OF THE INVENTION

As a technical effect of the methods and systems described and/or illustrated herein, blending of regions of a component into a general shape of the component is provided. For example, technical effects of the methods and systems described and/or illustrated herein may facilitate the automation of a blending process, thereby possibly reducing manual blending processes while increasing repeatability and reliability of the system, and while reducing fabrication costs and time cycles.

Figure 1:
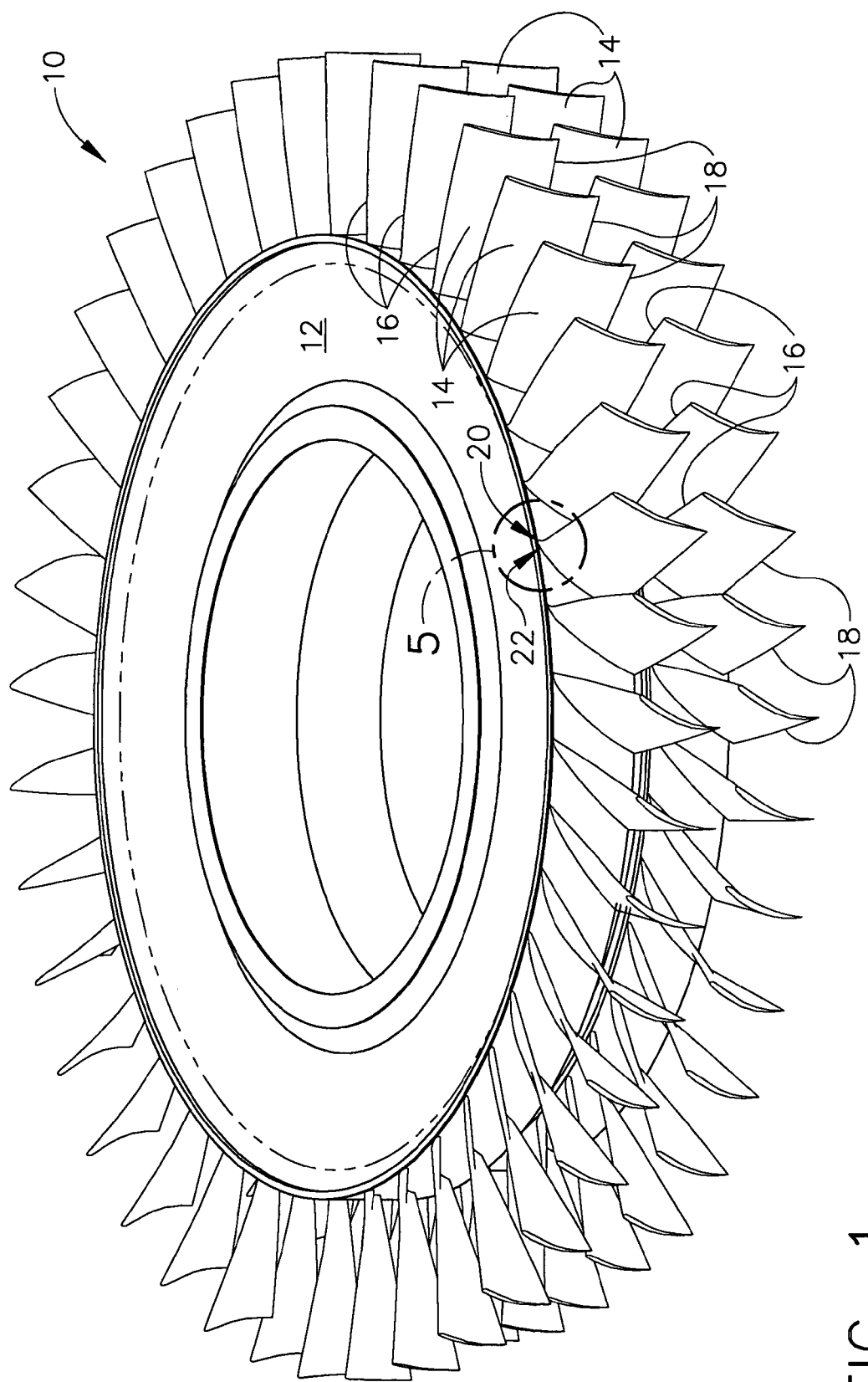
FIG. 1 is a perspective view of an exemplary component within a gas turbine engine.
Figure 2:
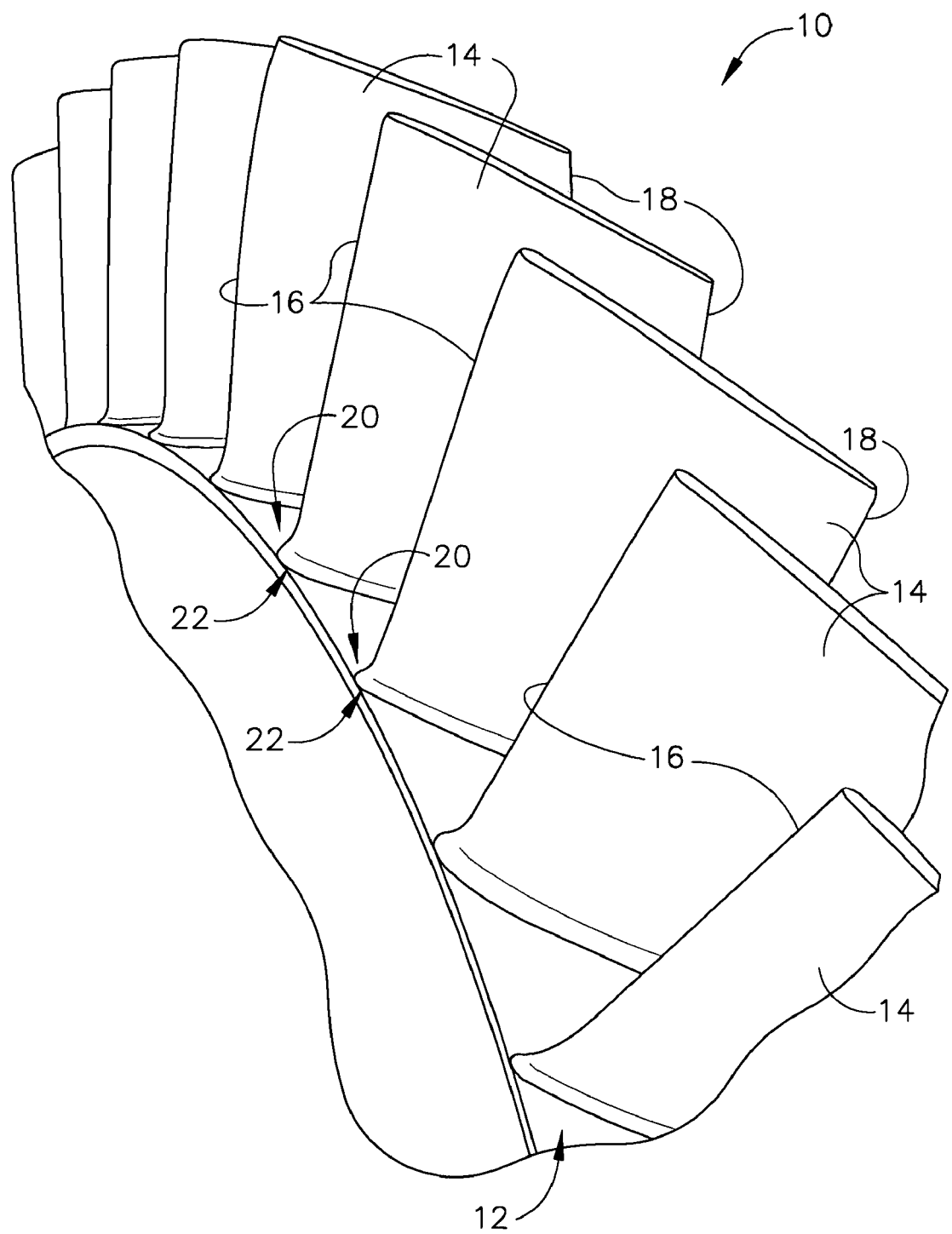
FIG. 2 is a partially broken away perspective view of a portion of the component shown in FIG. 1.

FIGS. 1 and 2 illustrate an exemplary component 10 that may include excess material following fabrication and/or repair. Specifically, FIG. 1 is a perspective view of an exemplary blisk 10 for a gas turbine engine (not shown) and FIG. 2 is a partially broken-away perspective view of a portion of blisk 10. Blisk 10 includes a hub 12 and a plurality of airfoils 14 extending outwardly from hub 12. Each airfoil 14 includes a leading edge 16 and a trailing edge 18. During manufacturing of blisk 10, excess material 20 may be produced at an intersection 22 of each leading edge 16 and hub 12. In addition, and/or alternatively, excess material may also be generated at an intersection between trailing edge 18 and hub 12. In addition, and/or alternatively, excess material may also be generated along leading edge 16 and/or trailing edge 18. In some embodiments, at least some excess material 20 requires removal to "blend" each of leading edge 16 into predetermined dimensions for hub 12 and airfoil 14.

As used herein, the term "region" with respect to a component, may include, but is not limited to including, any general and/or specific portion of the component, whether such portion be a single point on the component or a general area of the component that includes a plurality of single points. As used herein, the terms "property" and "properties" may include, but are not limited to including, any physical or structural properties of the component and/or a region(s) thereof such as, but not limited to, a size, a shape, a location, and/or an orientation. Other properties not described herein may be included within the meaning of the terms "property" and "properties" as used herein.

Figure 3:
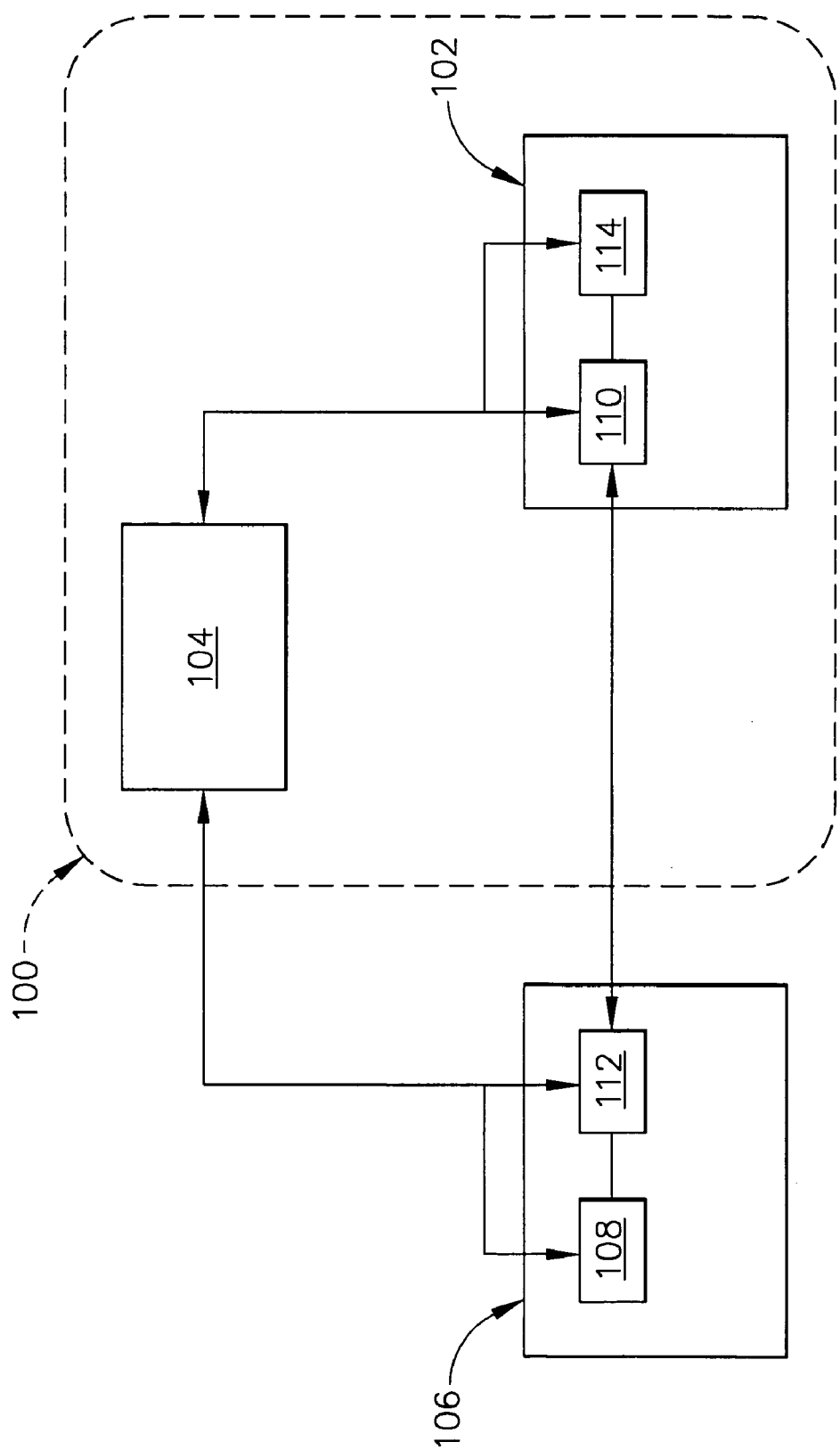
FIG. 3 is a block diagram of an exemplary system used in fabricating a component such as, but not limited to, the component shown in FIGS. 1 and 2.

FIG. 3 is a schematic view of an exemplary embodiment of a system 100 for fabricating a component such as, but not limited to, blisk 10 (shown in FIG. 1). System 100 generally includes a measuring tool 102 used to measure at least one property of the component, and a processor 104 operatively connected to measuring tool 102 for receiving measurements therefrom. Generally, and as will be described in more detail below, in one embodiment system 100 is operable to determine an actual property of a region (not shown in FIG. 3) of the component, and to compare the actual property with an expected property of the region to determine a difference between the actual property and the expected property. Moreover, system 100 is also operable to update a path of a fabricating tool 106 that is electronically stored in a memory 108 associated with, and operatively connected to, fabricating tool 106 and is also executable to at least partially fabricate the component based on the determined difference between the actual property and the expected property.

For example, to assist manufacturing processes that fabricate a finished component, a model of an expected geometry of the component may be generated. The model may include the geometry of unfinished surfaces of the component and/or finished surfaces that may be fabricated during a manufacturing process. To fabricate one or more finished surfaces, a path of fabricating tool 106 may be generated based on the geometry of the model, and more specifically may be based on the geometry of the finished surface(s) on the model. In one embodiment, for example, system 100 updates the path of fabricating tool 106 based on actual properties of the particular component being fabricated, and more specifically based on the difference between the actual properties of the particular component being fabricated and the expected properties of the model. In the exemplary embodiment, processor 104 does not generate the model of expected geometry of the component and/or does not generate the path of fabricating tool 106 based on the geometry of the model, but rather, a processor 110 associated with and operatively connected to measuring tool 102, for controlling operation of measuring tool 102, generates the model of expected geometry of the component. Moreover, in one embodiment, for example, processor 110 generates the path of fabricating tool 106 based on the geometry of the model. Even further, in one embodiment, and for example, a processor 112 associated with, and operatively connected to, fabricating tool 106 controls operation of fabricating tool 106, and generates the path of fabricating tool 106 based on the geometry of the model. However, in an alternative embodiment, processor 104 generates the model of expected geometry of the component and/or the path of fabricating tool 106 based on the geometry of the model.

Although memory 108 is described and illustrated herein as associated with fabricating tool 106, for example as a part of a machine (not shown) including fabricating tool 106, in one embodiment memory 108 is associated with processor 104 and/or measuring tool 102.

Fabricating tool 106 may be any tool used in fabricating the component by changing a property of the component, such as, but not limited to, through removing material from the component to fabricate a finished surface. For example, in one embodiment fabricating tool 106 is a machining tool. Although only one fabricating tool 106 is illustrated, it should be understood that system 100 may include and/or cooperate with any number of fabricating tools 106 to facilitate changing any number and/or type of properties at any component region. The desired fabricating path of fabricating tool 106 is electronically stored in memory 108 and is executable by processor 112. In one embodiment, fabricating tool 106 is coupled to a Computer Numerical Control (CNC) machine and the path of fabricating tool 106 is a computer numerical control path executed by processor 112, which, for example, may control operation of at least a portion of the CNC machine. Processor 104 may be operatively connected to memory 108 for accessing and updating the path of fabricating tool 106 stored therein. For example, in one embodiment processor 104 is operatively connected to memory 108 through processor 112. In another embodiment, processor 104 is directly connected to memory 108. In one embodiment, processor 104 and/or processor 110 is a personal computer. Although only one processor 104 is described and illustrated herein, it should be understood that any number of processors 104 may be used to perform any or all operations of processor 104 and/or system 100 generally that are described and/or illustrated herein. Moreover, in one embodiment, processor 112 and/or processor 110 perform any of the operations of processor 104 described and/or illustrated herein. Similarly, in one embodiment processor 102 performs any of the operations of processors 110 and/or 112 described and/or illustrated herein. In other words, in one embodiment, one or more processor(s) that perform any of the operations described and/or illustrated herein with respect to processors 104, 110, and/or 112 may be a part of a machine that manufactures the component (e.g., a CNC machine), may be a part of a machine that measures the component (e.g., measuring tool 106 and associated components thereof), and/or may be a processor dedicated to system 100 and operatively connected to the machine(s).

Measuring tool 102 may be any tool for measuring any physical property of the component. Although only one measuring tool 102 is shown in FIG. 3, it should be understood that the system 100 may include any number of measuring tools 102 for measuring any number and/or type of properties at any region(s) of the component. Measuring tool 102 may be located adjacent fabricating tool 106 such that measuring tool 102 can measure the component when the component is mounted adjacent fabricating tool 106 for fabrication thereof. Alternatively, in one embodiment measuring tool 102 is located remote from fabricating tool 106 such that measuring tool 102 measures the component remote from the fabricating tool 102. In one embodiment, measuring tool 102 is a part of an inspection machine, such as, but not limited to, a coordinate measuring machine, commercially available from Sheffield Measurement, Inc. of Fond du Lac, Wis. In one embodiment, measuring tool 102 is part of a machine including fabricating tool 106 (e.g., a Computer Numerical Control (CNC) machine), such as, but not limited to, an on-machine probing system commercially available from Marposs Corp., of Auburn Hills, Mich. The model of expected geometry of the component may be stored in a memory 114 associated with and operatively connected to measuring tool 102. Alternatively, the model of expected geometry of the component may be stored in memory 108. Processor 104 may be operatively connected to processor 110, memory 114, and/or memory 108 for accessing and updating the geometry of the model, and more specifically the geometry of the finished surface(s) on the model.

Figure 4:
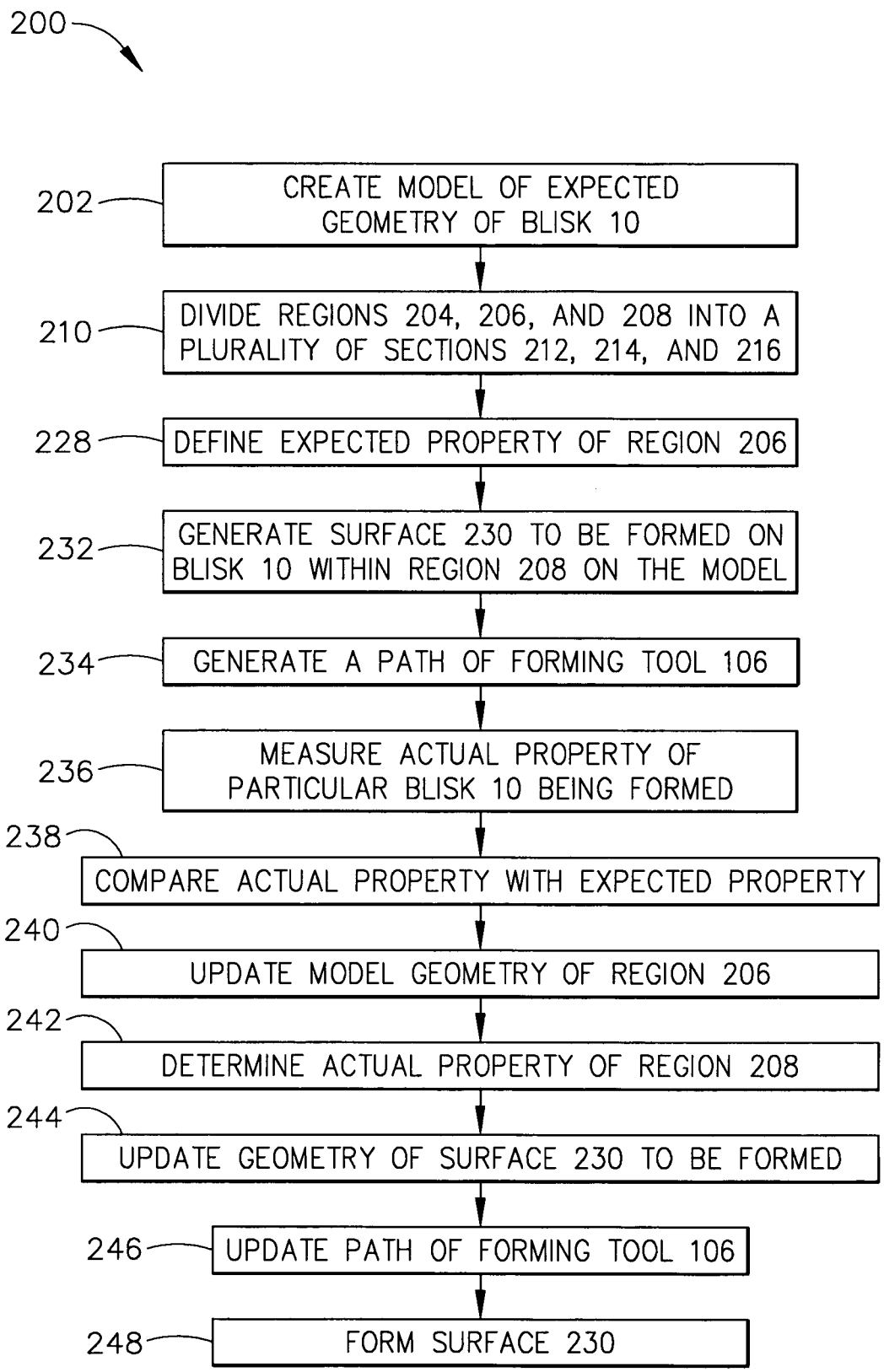
FIG. 4 is a flow chart illustrating an exemplary method for fabricating a component, such as, but not limited to the component shown in FIGS. 1 and 2, using the system shown in FIG. 3.

FIG. 4 is a flow chart illustrating an exemplary method 200 for use in fabricating a component, such as, but not limited to blisk 10 (shown in FIGS. 1 and 2). Method 200 may be performed, for example, using system 100 (shown in FIG. 3) and fabricating tool 106 (shown in FIG. 3), including any associated components thereof. Although the expected geometry model of blisk 10 may have any number of dimensions, in one embodiment the model of expected geometry of blisk 10 includes three dimensions. Although the model of expected geometry of blisk 10 may be created using any suitable method, software, and/or system, in one embodiment the model is created at least partially using UNIGRAPHICS® CAD/CAM software. (UNIGRAPHICS® is a trademark of UGS PLM Solutions, Inc. of Plano, Tex., and UNIGRAPHICS® CAD/CAM software is available from UGS PLM Solutions Inc., Maryland Heights, Mo.)

Figure 5:
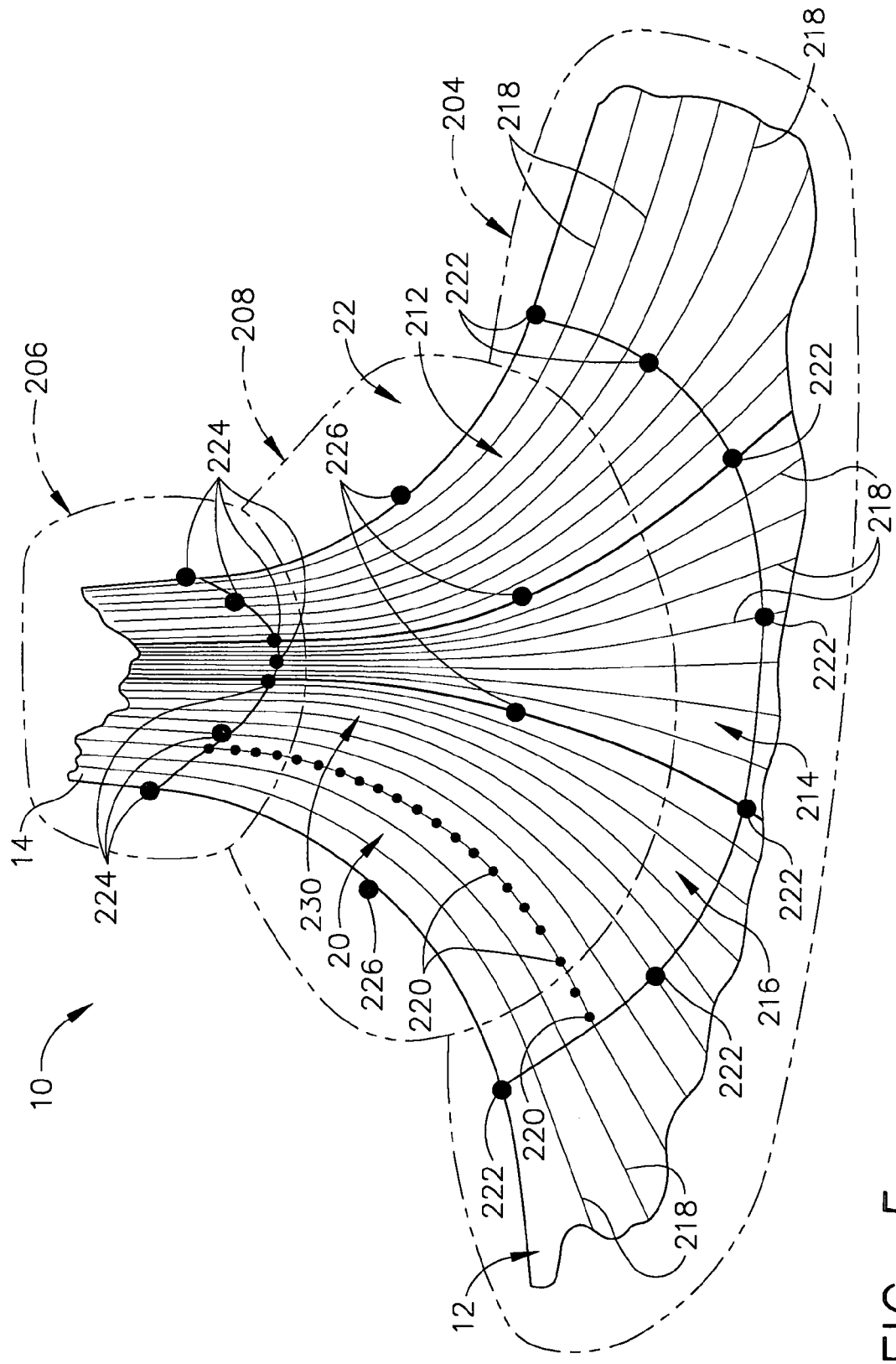
FIG. 5 is an enlarged view of a portion of the component shown in FIGS. 1 and 2.

FIG. 5 is an enlarged view of a portion of blisk 10 including intersection 22. Blisk 10, and accordingly the model of expected geometry of blisk 10, includes a region 204, a region 206, and a region 208 located at least partially between regions 204 and 206. Any of regions 204, 206, and 208 may be referred to herein as a first, a second, and/or a third region. In the exemplary embodiment, region 204 generally includes at least a portion of hub 12, for example, an area of hub 12 having a surface (not shown) to be fabricated (e.g., finished) via a machining process, region 206 generally includes at least a portion of airfoil 14, for example, an area of airfoil 14 having surfaces already finished, and region 208 generally includes excess material 20 at intersection 22. Of course, as shown in FIG. 5 and described herein with respect thereto, the locations of regions 204, 206, and 208 are exemplary only. In other embodiments, regions 204, 206, and 208 may be located at different locations on blisk 10 and/or include different portions of blisk 10 therein. Although only three regions 204, 206, and 208 are shown in FIG. 5 and described herein with respect thereto, blisk 10 may include any number of regions and/or method 200 and/or system 100 (shown in FIG. 3) may utilize any number of regions to perform the steps/operations thereof described and/or illustrated herein.

Referring now to FIGS. 4 and 5, method 200 includes dividing 210 regions 204, 206, and 208 into a plurality of sections (generally designated by 212, 214, and 216), wherein each section 212, 214, and 216 forms a portion of each region 204, 206, and 208. Any of sections 212, 214, and 216 may be referred to herein as a first, a second, and/or a third section. Each section 212, 214, and 216 is defined by a plurality of curves 218 (e.g., three dimensional splines) that are each defined by a plurality of defining points 220 extending along blisk 10. Although only three sections 212, 214, and 216 are shown in FIG. 5 and described herein with respect thereto, blisk 10 may include any number of sections, and/or method 200 and/or system 100 (shown in FIG. 3) may utilize any number of sections to perform the steps/operations thereof described and/or illustrated herein. Each region 204, 206, and 208 includes a plurality of control points 222, 224, and 226, respectively. Any of the control points 222, 224, and 226 may be referred to herein as a first and/or a second control point. In one embodiment, and as can be seen in FIG. 5, sections 212, 214, and/or 216 may share common control points.

Based on the model of expected geometry of blisk 10, an expected property of region 206 is defined 228. More specifically, and for example, in one embodiment an expected property of at least one control point 224 within region 206 is defined 228. Moreover, and for example, in the exemplary embodiment an expected location of each of the control points 224 is defined 228 based on the model. A surface (generally designated by 230) to be fabricated on blisk 10 within region 208 is then generated 232 on the model based on the expected property of the region, or more specifically in the exemplary embodiment, and for example, based on the expected locations of at least one of control points 224. The surface 230 may be eventually fabricated, for example, by removing at least some excess material 20 from region 208 to, for example, generally smooth a transition between region 204 and 206, also referred to herein as blending region 208 into regions 204 and 206. A path of a fabricating tool, such as, but not limited to, fabricating tool 106 (shown in FIG. 3), for fabricating surface 230 on blisk 10 is then generated 234 based on surface 230 (generated 232 on the model).

Because a general shape, size, orientation, and/or position of a region(s) (e.g., regions 204, 206, and/or 208) of a component may vary among a batch of the same components, when fabricating a particular component of the batch, a surface generated on a model of the component may not have the desired size, shape, orientation, and/or location for the particular component being fabricated. For example, differences between a location of control points (e.g., control points 224 within region 206) on a particular blisk 10 being fabricated and a location of corresponding control points on the model of blisk 10 may cause surface 230 generated on the model to have a size, shape, orientation, and/or location that does not adequately blend region 208 into regions 204 and 206 on the particular blisk 10 being fabricated. Accordingly, method 200 includes measuring 236 an actual property of a particular blisk 10 being fabricated. For example, in the exemplary embodiment, an actual location of at least one control point (e.g., control point(s) 224 and/or control point(s) 222) on a particular blisk 10 being fabricated is determined using, for example, measuring tool 102 (shown in FIG. 3). For each control point measured, a displacement is determined between the actual location of the control point on the particular blisk 10 being fabricated and the expected location by comparing 238 the actual location with the expected location. Displacements of other control points and/or any other portion of blisk 10 (e.g., at defining points 220) from an expected location(s) can be determined from the displacement of each measured control point, and/or by direct measurement using measuring tool 102. For example, the displacement of one or more control points 224 can be interpolated to all defining points 220 within the region 206 to generally update 240 the model geometry of region 206 to the actual geometry of region 206 on the particular blisk 10 being fabricated.

Although other interpolation methods may be used, in one embodiment the interpolation is performed using a method similar to Finite Element Methods that define stress, strain, and/or displacement at any point inside a region of a component as a function based on known values at a set of control points. Moreover, in one embodiment the interpolation is performed using an interpolation equation(s) for isoparametric quadrilateral sections.

Although other methods, software, and/or systems may be used for measurement of actual properties of blisk 10, comparison of actual properties with expected properties, and/or interpolation of any differences (e.g., displacement) between the actual properties and expected properties, in one embodiment VALYSIS software, commercially available from UGS of Maryland Heights, Mo., is used to measure and/or compare.

Once the geometry of region 206 has been updated 240 according to an actual geometry of the particular blisk 10 being fabricated, actual locations of control points 226 (which may lie under excess material 20) on surface 230 to be fabricated within region 208 can be determined 242 based on the updated geometry of region 206, and more specifically based on the displacements of one or more of control points 224 and/or defining points 220 within region 206 (and/or control points 222 and/or defining points 220 within region 204). The actual locations of the control points 226 based on the updated geometry of region 206 are determined to blend region 208 into regions 204 and 206. Specifically, because the geometry of region 206 (and/or region 204) is different than the geometry of the model, the surface 230 generated on the model may not adequately blend region 208 into regions 204 and 206 on the particular blisk 10 being fabricated. Accordingly, based on the displacements of one or more control points 224 and/or defining points 220 within region 206 (and/or control points 222 and/or defining points 220 within region 204), the surface 230 generated on the model can be updated 244 to blend regions 204, 206, and 208 on the particular blisk 10 being fabricated.

Specifically, the displacements of control points 224 and/or defining points 220 within region 206 (and/or control points 222 and/or defining points 220 within region 204) can be interpolated, similarly to as described above, to control points 226 to determine the actual location of control points 226. For example, a displacement of the actual locations of control points 226 from the expected locations of control points 226 on the model can be determined to generally update 244 geometry of the surface 230 to be fabricated on the particular blisk 10 to blend regions 204, 206, and 208 together. In one embodiment, the geometry of surface 230 to be fabricated is updated 244, and more specifically the actual locations of control points 226 are determined 242, based on an average displacement of at least two of control points 226 and/or defining points 220 within region 206 (and/or control points 222 and/or defining points 220 within region 204). In one embodiment, the average displacement is weighted such that the actual location of a particular control point 226 is more heavily influenced by the displacement of a particular control point 224 the closer thereto. In other words, the influence of the displacement of a particular control point 224 (and/or a particular defining point 220 and/or a particular control point 226) on each control point 226 is based on a distance between the particular control point and each control point 226. In one embodiment, the shared control points 222, 224, and/or 226 between sections 212, 214, and/or 216 facilitate blending between sections 222, 224, and/or 226.

In one embodiment, for example wherein region 204 includes a machined surface on the model, control points 222 within region 204 are considered to have zero displacement, such that the updated geometry of surface 230 is based on distortion of region 206 of the particular blisk 10 being fabricated. Alternatively, in one embodiment, for example where region 206 includes a machined surface on the model, control points 224 within region 206 are considered to have zero displacement, such that the updated geometry of surface 230 is based on distortion of region 204 of the particular blisk being fabricated. Considering some control points within a region as having zero displacement may facilitate maintaining a property of the machined surface within that region. In other words, while the geometry of particular components of a batch may vary, properties, for example a location, of certain machined surfaces of the components may need to remain within a predetermined tolerance. Accordingly, control points defining such machined surfaces may be considered to have zero displacement such that the machined surfaces are fabricated on each particular component of a batch thereof generally identically to the geometry of the machined surface on the model.

Once the geometry of surface 230 to be fabricated has been updated 244, the path of fabricating tool 106 for fabricating surface 230 is updated 246 based on the updated geometry of surface 230. Surface 230 can then be fabricated 248 using fabricating tool 106 and the updated path thereof, for example, by removing material from region 208. In one embodiment, surface 230 is fabricated using a five-axis milling operation.

Although the methods and systems described and/or illustrated herein are described and/or illustrated as blending three regions 204, 206, and 208 together, the methods and systems described and/or illustrated herein may blend any number of regions, areas, sections, surfaces, etc. of a component together.

The methods and systems described and/or illustrated herein are cost-effective and reliable for fabricating components. More specifically, the methods and systems described and/or illustrated herein facilitate blending regions of a component into a general shape of the component, for example to smooth a transition between a machined surface and a general shape of the component adjacent the surface. The methods and systems described and/or illustrated herein may facilitate automation of a blending process, thereby possibly reducing manual blending processes that may require specific operator skills and/or experience, may result in variations in the blended surfaces of different components within a batch, may require additional inspection and/or machining processes to finish the component, and/or may injure the operator. Accordingly, the methods and systems described and/or illustrated herein may facilitate decreasing a cost of producing a batch of components and/or increasing production of a batch components. For example, the methods and systems described and/or illustrated herein may facilitate the automation of a blending process, thereby possibly reducing manual blending processes while increasing repeatability and reliability of the system, and while reducing fabrication costs and time cycles.

Although the methods and systems described and/or illustrated herein are described and/or illustrated with respect to a gas turbine engine component, and more specifically a blisk for a gas turbine engine, practice of the methods and systems described and/or illustrated herein is not limited to blisks nor gas turbine engine components generally. Rather, the methods and systems described and/or illustrated herein are applicable to fabricating any component.

Exemplary embodiments of systems and methods are described and/or illustrated herein in detail. The systems and methods are not limited to the specific embodiments described herein, but rather, components of each system and steps of each method may be utilized independently and separately from other components and steps described herein. Each system component and method step can also be used in combination with other system components and/or method steps.

When introducing elements of the methods and systems described and/or illustrated herein, including any and all embodiment(s) thereof, the articles "a", "an", "the" and "said" are intended to mean that there are one or more of the elements. The terms "comprising", "including" and "having" are intended to be inclusive and mean that there may be additional elements other than the listed elements.

While the invention has been described in terms of various specific embodiments, those skilled in the art will recognize that the invention can be practiced with modification within the spirit and scope of the claims.

What is claimed is:

1. A method for fabricating a component using a tool, said method comprising:
   determining an actual property of a region of the component;
   comparing the actual property of the region of the component with an expected property of the region to determine a difference between the actual property and the expected property, wherein to compare the actual property of the region of the component with an expected property of the region an actual location of a first point within the region is compared to an expected location of the first point to determine a displacement of the first point from the expected location;
   interpolating a displacement of a second point using the displacement of the first point; and
   updating a path of the tool that is electronically stored in a memory and executable by a processor for fabricating the component based on the difference between the actual property and the expected property of the region.

2. A method in accordance with claim 1 further comprising:
   creating a model of an expected geometry of the component;
   defining the expected property of the region based on the model of expected geometry of the component;
   generating a surface to be fabricated on the component on the model of the component based on the expected property; and
   generating the path of the tool based on the surface to be fabricated prior to said updating the path of the tool.

3. A method in accordance with claim 1 wherein said updating a path of the tool comprises:
   updating a geometry of a surface to be fabricated on the component based on the difference between the actual property and the expected property; and
   updating the path of the tool based on the updated geometry of the surface to be fabricated.

4. A method in accordance with claim 1 further comprising at least partially fabricating the component using the updated path of the tool.

5. A method in accordance with claim 1 wherein the actual property of the region comprises at least one of an actual shape, an actual size, an actual orientation, and an actual location of the region, and wherein the expected property of the region comprises at least one of an expected shape, an expected size, an expected orientation, and an expected location of the region.

6. A method in accordance with claim 1 wherein the path of the tool is a computer numerical control path and the tool is a machining tool.

7. A method in accordance with claim 1 wherein the region is a first region of the component and the path of the tool corresponds to a second region of the component.

8. A method in accordance with claim 1 wherein the region is a first region of the component, the component includes a second region, and the path of the tool corresponds to a third region of the component located at least partially between the first and second regions.

9. A method in accordance with claim 8 further comprising blending the third region into the first and second regions using the updated path of the tool.

10. A method in accordance with claim 8 further comprising dividing the first, second, and third regions into a plurality of sections, wherein each section of the plurality of sections forms a portion of each of the first, second, and third regions, said comparing the actual property of the region of the component with an expected property of the region further comprising comparing an actual location of a first point located within the first region to an expected location of the first point to determine a displacement of the first point from the expected location.

11. A method in accordance with claim 10 wherein interpolating a displacement of a second point using the displacement of the first point comprises determining an actual location of the second point within the third region based on the displacement of the first point located within the first region.

12. A method in accordance with claim 11 wherein the first region includes a plurality of control points located therein, said determining an actual location of the second point within the third region comprising determining a displacement of the actual location from an expected location of the second point within the third region based on an average displacement of at least two of the plurality of control points located within the first region.

13. A system for fabricating a component using a fabricating tool, said system comprising:
   at least one measuring tool for measuring an actual property of a region of the component; and
   a processor operatively connected to the measuring tool for receiving measurements therefrom, said processor configured to:
      determine the actual property of the region of the component using the measuring tool;
      compare the actual property of the region of the component with an expected property of the region that is based on a model of an expected geometry of the component to determine a difference between the actual property and the expected property, wherein to compare the actual property of the region of the component with an expected property of the region an actual location of a first point within the region is compared to an expected location of the first point to determine a displacement of the first point from the expected location;
      interpolate a displacement of a second point using the displacement of the first point;
      update a geometry of a surface to be fabricated on the component based on the difference between the actual property and the expected property; and
      update a path of the fabricating tool that is electronically stored in a memory and is executable to fabricate the surface to be fabricated based on the updated geometry of the surface to be fabricated.

14. A system in accordance with claim 13 wherein the actual property of the region comprises at least one of an actual shape, an actual size, an actual orientation, and an actual location of the region, and wherein the expected property of the region comprises at least one of an expected shape, an expected size, an expected orientation, and an expected location of the region.

15. A system in accordance with claim 13 wherein the region is a first region of the component, the component includes a second region, and the path of the tool corresponds to a third region of the component located at least partially between the first and second regions.

16. A system in accordance with claim 15 wherein the processor is further configured to:
divide the first, second, and third regions into a plurality of sections, wherein each section of the plurality of sections forms a portion of each of the first, second, and third regions;
compare an actual location of at least one control point located within the first region to an expected location of the control point located within the first region to determine a displacement of the control point located within the first region from the expected location; and
determine an actual location of a control point located within the third region based on the displacement of the control point located within the first region.

17. A system in accordance with claim 16 wherein said processor is configured to determine the actual location of the control point located within the third region based on an average displacement of a plurality of control points located within the first region, and wherein the average displacement is weighted based on a distance between the control point located within the third region and each of the plurality of control points located within the first region.

18. A method for fabricating a component using a tool, said method comprising:
determining an actual location of a first point located within a first region of the component;
comparing the actual location of the first point with an expected location of the first point that is based on a model of an expected geometry of the component to determine a displacement of the actual location of the first point from the expected location;
interpolating a displacement of a second point located within a second region of the component using the displacement of the first point;
updating a geometry of a surface to be fabricated on the component within the second region of the component based on the displacement of the second point; and
updating a path of the tool that is electronically stored in a memory and is executable to at least partially fabricate the surface to be fabricated based on the updated geometry of the surface to be fabricated.

19. A method in accordance with claim 18 wherein the first region includes a plurality of control points located therein, said updating a geometry of a surface to be fabricated on the component within a second region of the component comprising updating a geometry of the surface to be fabricated on the component within the second region based on an average displacement of at least two of the plurality of control points located in the first region.

* * * * *